United States Patent
Wang et al.

(10) Patent No.: US 12,483,318 B2
(45) Date of Patent: Nov. 25, 2025

(54) TIMING SYNCHRONIZATION FOR NON-TERRESTRIAL NETWORK

(71) Applicant: Nokia Solutions and Networks Oy, Espoo (FI)

(72) Inventors: Jerry Wang, Marlboro, NJ (US); Heiko Straulino, Eurasburg (DE)

(73) Assignee: Nokia Solutions and Networks Oy, Espoo (FI)

( * ) Notice: Subject to any disclaimer, the term of this patent is extended or adjusted under 35 U.S.C. 154(b) by 363 days.

(21) Appl. No.: 18/198,534

(22) Filed: May 17, 2023

(65) Prior Publication Data
US 2023/0379041 A1    Nov. 23, 2023

(30) Foreign Application Priority Data

May 20, 2022  (FI) ...................................... 20225447

(51) Int. Cl.
*H04B 7/185*    (2006.01)
*H04B 7/08*     (2006.01)
(Continued)

(52) U.S. Cl.
CPC ........... *H04B 7/185* (2013.01); *H04B 7/0817* (2013.01); *H04W 56/0005* (2013.01); *H04W 84/06* (2013.01)

(58) Field of Classification Search
CPC .. H04B 7/0819; H04B 7/185; H04B 7/18513; H04B 7/18517; H04W 56/0005; H04W 56/0045; H04W 56/0055; H04W 84/06
See application file for complete search history.

(56) References Cited

U.S. PATENT DOCUMENTS

| | | | |
|---|---|---|---|
| 8,406,795 B2 * | 3/2013 | Lane ................. | H04W 56/0005 455/208 |
| 11,019,583 B2 * | 5/2021 | Laselva ................. | H04W 72/21 |

(Continued)

FOREIGN PATENT DOCUMENTS

| | | |
|---|---|---|
| CN | 113676234 A | 11/2021 |
| CN | 114303427 A | 4/2022 |
| EP | 3 799 470 A1 | 3/2021 |

OTHER PUBLICATIONS

Martinez-de-Rioja, Daniel, et al., Transmit-Receive Parabolic Reflectarray to Generate Two Beams per Feed for Multispot Satellite Antennas in Ka-Band, IEEE Transactions on Antennas and Propagation, vol. 60, No. 5, May 2021, pp. 2673-2685.

(Continued)

*Primary Examiner* — Alpus Hsu
(74) *Attorney, Agent, or Firm* — McCarter & English LLP

(57) ABSTRACT

A method includes receiving a first antenna stream from a first feeder link to a first non-terrestrial network payload, wherein the first antenna stream includes signals transmitted by terminal devices that are synchronized in time, receiving a second antenna stream from a second feeder link to a second non-terrestrial network payload, wherein the second antenna stream includes signals transmitted by the terminal devices that are not synchronized in time, storing the first and second antenna streams in buffers, obtaining a first timing advance, obtaining a second timing advance, obtaining an estimation of timing offset based on the timing advances, obtaining the second antenna stream from a second one of the buffers and performing timing offset compensation to the second antenna stream based on the estimation of the timing offset, and obtaining the first (Continued)

antenna stream from a first one of the buffers synchronized with the second antenna stream.

10 Claims, 6 Drawing Sheets

(51) Int. Cl.
  *H04W 56/00* (2009.01)
  *H04W 84/06* (2009.01)

(56) References Cited

U.S. PATENT DOCUMENTS

| | | | |
|---|---|---|---|
| 2020/0162985 A1 | 5/2020 | Roy et al. | 36/22 |
| 2020/0351728 A1* | 11/2020 | Chien | H04W 56/001 |
| 2020/0412440 A1 | 12/2020 | Jayasimha et al. | |
| 2021/0044349 A1 | 2/2021 | Yao et al. | |
| 2022/0038139 A1* | 2/2022 | Eriksson Löwenmark | H04W 72/23 |
| 2023/0135149 A1* | 5/2023 | Krishnamurthy | H04W 56/0015 455/456.1 |
| 2024/0137888 A1* | 4/2024 | Li | H04B 7/18502 |
| 2024/0224212 A1* | 7/2024 | Dai | H04W 56/0045 |

OTHER PUBLICATIONS

Martinez-de-Rioja, Eduardo, et al., "Advanced Multibeam Antenna Configurations Base don Reflectarrays: Providing multisport coverage with a smaller number of apertures for satellite communications in the K and Ka bands", IEEE Antennas and Propagation Magazine, IEEE Service Center, vol. 61, No. 5, Oct. 2019, pp. 77-86.

Bayer, Hendrik, et al., "Ka-Band User Terminal Antennas for Satellite Communications [Antenna Applications Corner]", IEEE Antennas and Propagation Magazine, IEEE Service Center, vol. 58, No. 1, Feb. 2016, pp. 76-88.

"3$^{rd}$ Generation Partnership Project; Technical Specification Group Radio Access Network; Solutions for NR to support non-terrestrial networks (NTN) (Release 16)," 3GPP TR 38.821 V16.1.0, May 2021.

Nokia et al., "Doppler Compensation, Uplink Timing Advance and Random Access in NTN," 3GPP TSG RAN WG1 #99, R1-1913017, Nov. 18-22, 2019, Reno, USA.

* cited by examiner

TIMING SYNCHRONIZATION FOR NON-TERRESTRIAL NETWORK

FIELD

The following exemplary embodiments relate to wireless communication and timing synchronization when the network comprises non-terrestrial elements.

BACKGROUND

Cellular communication networks evolve, and the network structure may comprise not only terminal devices and access nodes located on ground, but there may also be entities that may be considered as flying objects thus expanding the cellular communication network to a network that can be understood as a non-terrestrial network. For example, a non-terrestrial network may comprise non-terrestrial platforms such as satellites and/or high-altitude platform systems, such as airplanes, balloons and airships, in addition to the terminal devices and access nodes.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for: receiving a first antenna stream from a first feeder link to a first non-terrestrial network payload, wherein the first antenna stream comprises signals, the signals being transmitted by a plurality of terminal devices, that are synchronized in time, receiving a second antenna stream from a second feeder link to a second non-terrestrial network payload, wherein the second antenna stream comprises signals, the signals being transmitted by the plurality of terminal devices, that are not synchronized in time, storing the first antenna stream in a first buffer and the second antenna stream in a second buffer, obtaining a first timing advance based on physical random access channel processing performed to the second antenna stream, obtaining a second timing advance from a receiver, obtaining an estimation of timing offset based on the first timing advance and the second timing advance, obtaining the second antenna stream from the second buffer and perform timing offset compensation to the second antenna stream based on the estimation of the timing offset, and obtaining the first antenna stream from the first buffer such that it is synchronized with the second antenna stream.

In some example embodiments according to the first aspect, the means comprises at least one processor, and at least one memory, including a computer program code, wherein the at least one memory and the computer program code are configured, with the at least one processor, to cause the performance of the apparatus.

According to a second aspect there is provided an apparatus comprising at least one processor, and at least one memory including a computer program code, wherein the at least one memory and the computer program code are configured, with the at least one processor, to cause the apparatus to: receive a first antenna stream from a first feeder link to a first non-terrestrial network payload, wherein the first antenna stream comprises signals, the signals being transmitted by a plurality of terminal devices, that are synchronized in time, receive a second antenna stream from a second feeder link to a second non-terrestrial network payload, wherein the second antenna stream comprises signals, the signals being transmitted by the plurality of terminal devices, that are not synchronized in time, store the first antenna stream in a first buffer and the second antenna stream in a second buffer, obtain a first timing advance based on physical random access channel processing performed to the second antenna stream, obtain a second timing advance from a receiver, obtain an estimation of timing offset based on the first timing advance and the second timing advance, obtain the second antenna stream from the second buffer and perform timing offset compensation to the second antenna stream based on the estimation of the timing offset, and obtain the first antenna stream from the first buffer such that it is synchronized with the second antenna stream.

According to a third aspect there is provided a method comprising: receiving a first antenna stream from a first feeder link to a first non-terrestrial network payload, wherein the first antenna stream comprises signals, the signals being transmitted by a plurality of terminal devices, that are synchronized in time, receiving a second antenna stream from a second feeder link to a second non-terrestrial network payload, wherein the second antenna stream comprises signals, the signals being transmitted by the plurality of terminal devices, that are not synchronized in time, storing the first antenna stream in a first buffer and the second antenna stream in a second buffer, obtaining a first timing advance based on physical random access channel processing performed to the second antenna stream, obtaining a second timing advance from a receiver, obtaining an estimation of timing offset based on the first timing advance and the second timing advance, obtaining the second antenna stream from the second buffer and perform timing offset compensation to the second antenna stream based on the estimation of the timing offset, and obtaining the first antenna stream from the first buffer such that it is synchronized with the second antenna stream.

According to a fourth aspect there is provided a computer program comprising instructions for causing an apparatus to perform at least the following: receive a first antenna stream from a first feeder link to a first non-terrestrial network payload, wherein the first antenna stream comprises signals, the signals being transmitted by a plurality of terminal devices, that are synchronized in time, receive a second antenna stream from a second feeder link to a second non-terrestrial network payload, wherein the second antenna stream comprises signals, the signals being transmitted by the plurality of terminal devices, that are not synchronized in time, store the first antenna stream in a first buffer and the second antenna stream in a second buffer, obtain a first timing advance based on physical random access channel processing performed to the second antenna stream, obtain a second timing advance from a receiver, obtain an estimation of timing offset based on the first timing advance and the second timing advance, obtain the second antenna stream from the second buffer and perform timing offset compensation to the second antenna stream based on the estimation of the timing offset, and obtain the first antenna stream from the first buffer such that it is synchronized with the second antenna stream.

According to a fifth aspect there is provided a computer program comprising instructions stored thereon for performing at least the following: receiving a first antenna stream from a first feeder link to a first non-terrestrial network payload, wherein the first antenna stream comprises signals, the signals being transmitted by a plurality of terminal devices, that are synchronized in time, receiving a second antenna stream from a second feeder link to a second non-terrestrial network payload, wherein the second antenna stream comprises signals, the signals being transmitted by the plurality of terminal devices, that are not synchronized in time, storing the first antenna stream in a first buffer and the second antenna stream in a second buffer, obtaining a first timing advance based on physical random access channel processing performed to the second antenna stream, obtaining a second timing advance from a receiver, obtaining an estimation of timing offset based on the first timing advance and the second timing advance, obtaining the second antenna stream from the second buffer and perform timing offset compensation to the second antenna stream based on the estimation of the timing offset, and obtaining the first antenna stream from the first buffer such that it is synchronized with the second antenna stream.

According to a sixth aspect there is provided a non-transitory computer readable medium comprising program instructions for causing an apparatus to perform at least the following: receive a first antenna stream from a first feeder link to a first non-terrestrial network payload, wherein the first antenna stream comprises signals, the signals being transmitted by a plurality of terminal devices, that are synchronized in time, receive a second antenna stream from a second feeder link to a second non-terrestrial network payload, wherein the second antenna stream comprises signals, the signals being transmitted by the plurality of terminal devices, that are not synchronized in time, store the first antenna stream in a first buffer and the second antenna stream in a second buffer, obtain a first timing advance based on physical random access channel processing performed to the second antenna stream, obtain a second timing advance from a receiver, obtain an estimation of timing offset based on the first timing advance and the second timing advance, obtain the second antenna stream from the second buffer and perform timing offset compensation to the second antenna stream based on the estimation of the timing offset, and obtain the first antenna stream from the first buffer such that it is synchronized with the second antenna stream.

According to a seventh aspect there is provided a non-transitory computer readable medium comprising program instructions stored thereon for performing at least the following: receiving a first antenna stream from a first feeder link to a first non-terrestrial network payload, wherein the first antenna stream comprises signals, the signals being transmitted by a plurality of terminal devices, that are synchronized in time, receiving a second antenna stream from a second feeder link to a second non-terrestrial network payload, wherein the second antenna stream comprises signals, the signals being transmitted by the plurality of terminal devices, that are not synchronized in time, storing the first antenna stream in a first buffer and the second antenna stream in a second buffer, obtaining a first timing advance based on physical random access channel processing performed to the second antenna stream, obtaining a second timing advance from a receiver, obtaining an estimation of timing offset based on the first timing advance and the second timing advance, obtaining the second antenna stream from the second buffer and perform timing offset compensation to the second antenna stream based on the estimation of the timing offset, and obtaining the first antenna stream from the first buffer such that it is synchronized with the second antenna stream.

According to an eight aspect there is provided an apparatus comprising means for: determining, that a signal is to be transmitted to a terminal device, performing a first delay adjustment to the signal, wherein the first delay adjustment is performed based on a first timing advance measurement associated with a first path that is associated with a first non-terrestrial platform, transmitting the signal to a first feeder link associated with the first non-terrestrial payload for further re-transmitting the signal to a terminal device, performing a second delay adjustment to the signal, wherein the second delay adjustment is performed based on a second timing advance measurement associated with a second path that is associated with a second non-terrestrial payload, transmitting the signal to a second feeder link associated with the second non-terrestrial payload for further re-transmitting the signal to the terminal device.

In some example embodiments according to the eighth aspect, the means comprises at least one processor, and at least one memory, including a computer program code, wherein the at least one memory and the computer program code are configured, with the at least one processor, to cause the performance of the apparatus.

According to a ninth aspect there is provided an apparatus comprising at least one processor, and at least one memory including a computer program code, wherein the at least one memory and the computer program code are configured, with the at least one processor, to cause the apparatus to: determine, that a signal is to be transmitted to a terminal device, perform a first delay adjustment to the signal, wherein the first delay adjustment is performed based on a first timing advance measurement associated with a first path that is associated with a first non-terrestrial platform, transmit the signal to a first feeder link associated with the first non-terrestrial payload for further re-transmitting the signal to a terminal device, perform a second delay adjustment to the signal, wherein the second delay adjustment is performed based on a second timing advance measurement associated with a second path that is associated with a second non-terrestrial payload, transmit the signal to a second feeder link associated with the second non-terrestrial payload for further re-transmitting the signal to the terminal device.

According to a tenth aspect there is provided a method comprising: determining, that a signal is to be transmitted to a terminal device, performing a first delay adjustment to the signal, wherein the first delay adjustment is performed based on a first timing advance measurement associated with a first path that is associated with a first non-terrestrial platform, transmitting the signal to a first feeder link associated with the first non-terrestrial payload for further re-transmitting the signal to a terminal device, performing a second delay adjustment to the signal, wherein the second delay adjustment is performed based on a second timing advance measurement associated with a second path that is associated with a second non-terrestrial payload, transmitting the signal to a second feeder link associated with the second non-terrestrial payload for further re-transmitting the signal to the terminal device.

According to an eleventh aspect there is provided a computer program comprising instructions for causing an apparatus to perform at least the following: determine, that a signal is to be transmitted to a terminal device, perform a first delay adjustment to the signal, wherein the first delay adjustment is performed based on a first timing advance measurement associated with a first path that is associated with a first non-terrestrial platform, transmit the signal to a first feeder link associated with the first non-terrestrial payload for further re-transmitting the signal to a terminal device, perform a second delay adjustment to the signal, wherein the second delay adjustment is performed based on a second timing advance measurement associated with a second path that is associated with a second non-terrestrial payload, transmit the signal to a second feeder link associated with the second non-terrestrial payload for further re-transmitting the signal to the terminal device.

According to a twelfth aspect there is provided a computer program comprising instructions stored thereon for performing at least the following: determining, that a signal is to be transmitted to a terminal device, performing a first delay adjustment to the signal, wherein the first delay adjustment is performed based on a first timing advance measurement associated with a first path that is associated with a first non-terrestrial platform, transmitting the signal to a first feeder link associated with the first non-terrestrial payload for further re-transmitting the signal to a terminal device, performing a second delay adjustment to the signal, wherein the second delay adjustment is performed based on a second timing advance measurement associated with a second path that is associated with a second non-terrestrial payload, transmitting the signal to a second feeder link associated with the second non-terrestrial payload for further re-transmitting the signal to the terminal device.

According to a thirteenth aspect there is provided a non-transitory computer readable medium comprising program instructions for causing an apparatus to perform at least the following: determine, that a signal is to be transmitted to a terminal device, perform a first delay adjustment to the signal, wherein the first delay adjustment is performed based on a first timing advance measurement associated with a first path that is associated with a first non-terrestrial platform, transmit the signal to a first feeder link associated with the first non-terrestrial payload for further re-transmitting the signal to a terminal device, perform a second delay adjustment to the signal, wherein the second delay adjustment is performed based on a second timing advance measurement associated with a second path that is associated with a second non-terrestrial payload, transmit the signal to a second feeder link associated with the second non-terrestrial payload for further re-transmitting the signal to the terminal device.

According to a fourteenth aspect there is provided a non-transitory computer readable medium comprising program instructions stored thereon for performing at least the following: determining, that a signal is to be transmitted to a terminal device, performing a first delay adjustment to the signal, wherein the first delay adjustment is performed based on a first timing advance measurement associated with a first path that is associated with a first non-terrestrial platform, transmitting the signal to a first feeder link associated with the first non-terrestrial payload for further re-transmitting the signal to a terminal device, performing a second delay adjustment to the signal, wherein the second delay adjustment is performed based on a second timing advance measurement associated with a second path that is associated with a second non-terrestrial payload, transmitting the signal to a second feeder link associated with the second non-terrestrial payload for further re-transmitting the signal to the terminal device.

According to a fifteenth aspect there is provided a system comprising an access node located on the ground, a first non-terrestrial network platform and a second non-terrestrial network platform, the system the system comprising means for performing: receiving, by the first non-terrestrial network payload, a first transmission comprising signals that are synchronized in time, and transmit the first transmission to the access node, receiving, by the second non-terrestrial network payload, a second transmission comprising signals that are not synchronized in time, and transmit the second transmission to the access node, storing, by the access node, the first transmission to a first buffer and the second transmission to a second buffer, obtaining, by the access node, a first timing advance based on physical random access channel processing performed to the second transmission, obtaining, by the access node, a second timing advance from a receiver, obtaining, by the access node, an estimation of timing offset based on the first timing advance and the second timing advance, obtaining, by the access node, the second transmission from the second buffer and perform timing offset compensation to the second transmission based on the estimation of the timing offset, and obtaining, by the access node, the first transmission from the first buffer such that it is synchronized with the second transmission.

According to a sixteenth aspect there is provided a system comprising an access node located on the ground, a first non-terrestrial network platform and a second non-terrestrial network platform, the system being caused to: receive, by the first non-terrestrial network payload, a first transmission comprising signals that are synchronized in time, and transmit the first transmission to the access node, receive, by the second non-terrestrial network payload, a second transmission comprising signals that are not synchronized in time, and transmit the second transmission to the access node, store, by the access node, the first transmission to a first buffer and the second transmission to a second buffer, obtain, by the access node, a first timing advance based on physical random access channel processing performed to the second transmission, obtain, by the access node, a second timing advance from a receiver, obtain, by the access node, an estimation of timing offset based on the first timing advance and the second timing advance, obtain, by the access node, the second transmission from the second buffer and perform timing offset compensation to the second transmission based on the estimation of the timing offset, and obtain, by the access node, the first transmission from the first buffer such that it is synchronized with the second transmission.

According to a seventeenth aspect there is provided an apparatus comprising means for: providing a geographic cell using at least a first antenna and a second antenna, wherein the first antenna and the second antenna are comprised in a non-terrestrial payload located on a non-terrestrial platform, and providing, to a terminal device located in the geographical cell or to an access node, a transmission using the first antenna and the second antenna, wherein the first antenna and the second antenna to have an orthogonal polarization angle with respect to each other.

In some example embodiments according to the seventeenth aspect, the means comprises at least one processor, and at least one memory, including a computer program code, wherein the at least one memory and the computer program code are configured, with the at least one processor, to cause the performance of the apparatus.

According to an eighteenth aspect there is provided an apparatus comprising at least one processor, and at least one memory including a computer program code, wherein the at least one memory and the computer program code are configured, with the at least one processor, to cause the apparatus to: provide a geographic cell using at least a first antenna and a second antenna, wherein the first antenna and the second antenna are comprised in a non-terrestrial payload located on a non-terrestrial platform, and provide, to a terminal device located in the geographical cell or to an access node, a transmission using the first antenna and the second antenna, wherein the first antenna and the second antenna to have an orthogonal polarization angle with respect to each other.

According to a nineteenth aspect there is provided a method comprising: providing a geographic cell using at least a first antenna and a second antenna, wherein the first antenna and the second antenna are comprised in a non-terrestrial payload located on a non-terrestrial platform, and providing, to a terminal device located in the geographical cell or to an access node, a transmission using the first antenna and the second antenna, wherein the first antenna and the second antenna to have an orthogonal polarization angle with respect to each other.

According to a twentieth aspect there is provided a computer program comprising instructions for causing an apparatus to perform at least the following: provide a geographic cell using at least a first antenna and a second antenna, wherein the first antenna and the second antenna are comprised in a non-terrestrial payload located on a non-terrestrial platform, and provide, to a terminal device located in the geographical cell or to an access node, a transmission using the first antenna and the second antenna, wherein the first antenna and the second antenna to have an orthogonal polarization angle with respect to each other.

According to a twenty-first aspect there is provided a computer program comprising instructions stored thereon for performing at least the following: providing a geographic cell using at least a first antenna and a second antenna, wherein the first antenna and the second antenna are comprised in a non-terrestrial payload located on a non-terrestrial platform, and providing, to a terminal device located in the geographical cell or to an access node, a transmission using the first antenna and the second antenna, wherein the first antenna and the second antenna to have an orthogonal polarization angle with respect to each other.

According to a twenty-second aspect there is provided a non-transitory computer readable medium comprising program instructions for causing an apparatus to perform at least the following: provide a geographic cell using at least a first antenna and a second antenna, wherein the first antenna and the second antenna are comprised in a non-terrestrial payload located on a non-terrestrial platform, and provide, to a terminal device located in the geographical cell or to an access node, a transmission using the first antenna and the second antenna, wherein the first antenna and the second antenna to have an orthogonal polarization angle with respect to each other.

According to a twenty-third aspect there is provided a non-transitory computer readable medium comprising program instructions stored thereon for performing at least the following: providing a geographic cell using at least a first antenna and a second antenna, wherein the first antenna and the second antenna are comprised in a non-terrestrial payload located on a non-terrestrial platform, and providing, to a terminal device located in the geographical cell or to an access node, a transmission using the first antenna and the second antenna, wherein the first antenna and the second antenna to have an orthogonal polarization angle with respect to each other.

According to a twenty-fourth aspect there is provided an apparatus comprising means for: transmitting, via a non-terrestrial payload comprising a first antenna and located on a non-terrestrial platform, to a terminal device a command to select a second antenna comprised in the terminal device to be a target antenna, measuring link performance associated with the non-terrestrial payload, determining that the link performance is below a threshold value, and providing, to the terminal device, an instruction to the terminal device to switch to a third antenna comprised in the terminal device, wherein the third antenna has a polarization angle that is different than the polarization angle of the second antenna.

In some example embodiments according to the twenty-fourth aspect, the means comprises at least one processor, and at least one memory, including a computer program code, wherein the at least one memory and the computer program code are configured, with the at least one processor, to cause the performance of the apparatus.

According to a twenty-fifth aspect there is provided an apparatus comprising at least one processor, and at least one memory including a computer program code, wherein the at least one memory and the computer program code are configured, with the at least one processor, to cause the apparatus to: transmit, via a non-terrestrial payload comprising a first antenna and located on a non-terrestrial platform, to a terminal device a command to select a second antenna comprised in the terminal device to be a target antenna, measure link performance associated with the non-terrestrial payload, determine that the link performance is below a threshold value, and provide, to the terminal device, an instruction to the terminal device to switch to a third antenna comprised in the terminal device, wherein the third antenna has a polarization angle that is different than the polarization angle of the second antenna.

According to a twenty-sixth aspect there is provided a method comprising: transmitting, via a non-terrestrial payload comprising a first antenna and located on a non-terrestrial platform, to a terminal device a command to select a second antenna comprised in the terminal device to be a target antenna, measuring link performance associated with the non-terrestrial payload, determining that the link performance is below a threshold value, and providing, to the terminal device, an instruction to the terminal device to switch to a third antenna comprised in the terminal device, wherein the third antenna has a polarization angle that is different than the polarization angle of the second antenna.

According to a twenty-seventh aspect there is provided a computer program comprising instructions for causing an apparatus to perform at least the following: transmit, via a non-terrestrial payload comprising a first antenna and located on a non-terrestrial platform, to a terminal device a command to select a second antenna comprised in the terminal device to be a target antenna, measure link performance associated with the non-terrestrial payload, determine that the link performance is below a threshold value, and provide, to the terminal device, an instruction to the terminal device to switch to a third antenna comprised in the terminal device, wherein the third antenna has a polarization angle that is different than the polarization angle of the second antenna.

According to a twenty-eighth aspect there is provided a computer program comprising instructions stored thereon for performing at least the following: transmitting, via a non-terrestrial payload comprising a first antenna and located on a non-terrestrial platform, to a terminal device a command to select a second antenna comprised in the terminal device to be a target antenna, measuring link performance associated with the non-terrestrial payload, determining that the link performance is below a threshold value, and providing, to the terminal device, an instruction to the terminal device to switch to a third antenna comprised in the terminal device, wherein the third antenna has a polarization angle that is different than the polarization angle of the second antenna.

According to a twenty-ninth aspect there is provided a non-transitory computer readable medium comprising program instructions for causing an apparatus to perform at least the following: transmit, via a non-terrestrial payload comprising a first antenna and located on a non-terrestrial platform, to a terminal device a command to select a second antenna comprised in the terminal device to be a target antenna, measure link performance associated with the non-terrestrial payload, determine that the link performance is below a threshold value, and provide, to the terminal device, an instruction to the terminal device to switch to a third antenna comprised in the terminal device, wherein the third antenna has a polarization angle that is different than the polarization angle of the second antenna.

According to a thirtieth aspect there is provided a non-transitory computer readable medium comprising program instructions stored thereon for performing at least the following: transmitting, via a non-terrestrial payload comprising a first antenna and located on a non-terrestrial platform, to a terminal device a command to select a second antenna comprised in the terminal device to be a target antenna, measuring link performance associated with the non-terrestrial payload, determining that the link performance is below a threshold value, and providing, to the terminal device, an instruction to the terminal device to switch to a third antenna comprised in the terminal device, wherein the third antenna has a polarization angle that is different than the polarization angle of the second antenna.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
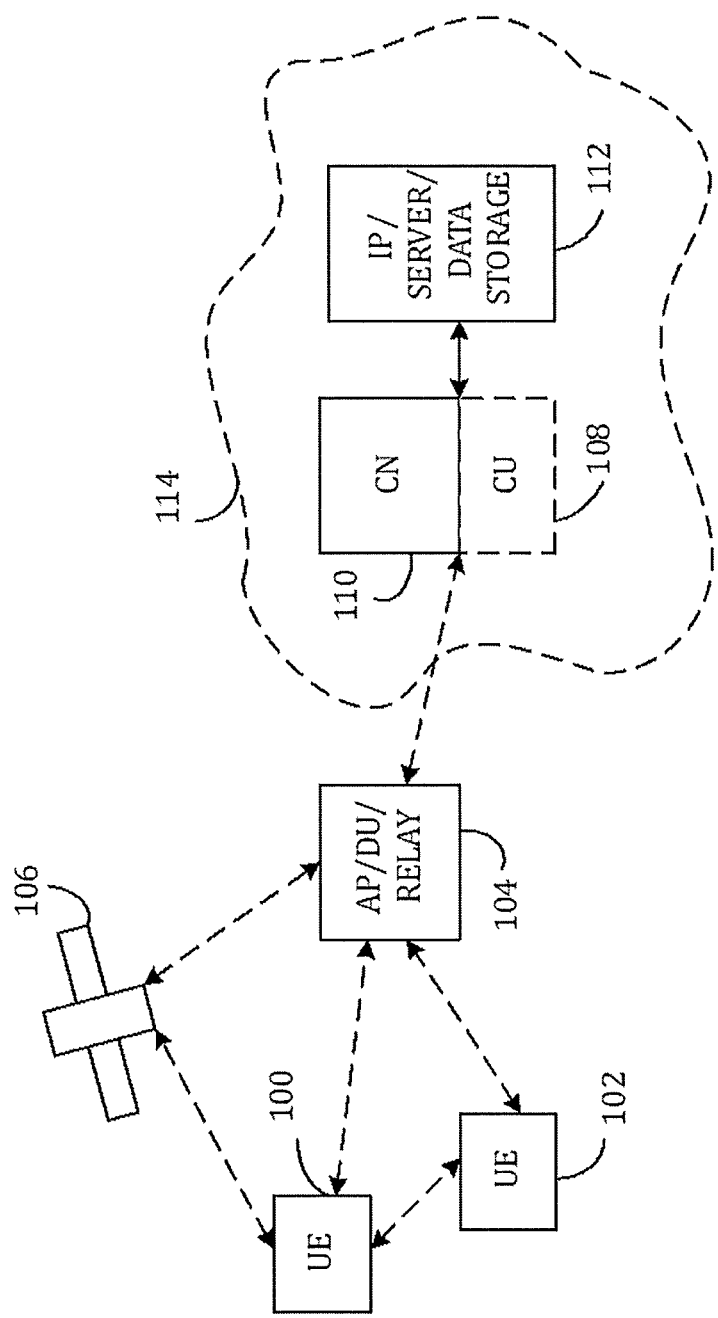

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

Non-terrestrial networks (NTNs) may be used to provide mobile and fixed communication services. An NTN may use a transparent payload architecture to do this. In the transparent payload architecture, a non-terrestrial platform, which may be located on a satellite or on a HAPS and which may also be understood as a network node, may be caused to function as an analogue radio frequency (RF) repeater for RF signals generated by access nodes that are comprised in the NTN and are located on the ground. The NTN platform connects to an access node on the ground, that is, to an an-ground access node, via a feeder link and a gateway, and to a terminal device via a service link using a Uu interface. Thus, the NTN platform receives for example a NR-Uu signal via the feeder link and forwards it to the terminal device, after performing frequency conversion and/or amplification, via the service link and vice versa.

In an NTN, the distance between a terminal device and an NTN platform is great and may be for example 500-2000 km in case of low Earth orbit satellites. Such distances may cause challenges in terms of link budget and thus result in low achievable data rates. To overcome this issue and to improve reliability of transmission and/or achievable data rates, multi-antenna transmission and reception may be utilized. Yet, to be able to perform digital processing for multiple antenna streams in a transparent payload architecture by the on-ground access node, accurate time synchronization between the antenna streams is required. Accurate time synchronization however may, however, be difficult to achieve as the distances between the NTN platforms and the access node, that is on the ground, are large and also variable. For example, if in an NTN antenna streams are sent and/or received via different NTN platforms, accurate time synchronization may be challenging due to the high and variable differential delay.

Even though an NTN may be compatible with existing terminal devices that follow 3GPP standards such as LTE and 5G, the distance between an NTN platform and a terminal device may be for example 1500 km meaning that it is 20 time longer than the distance between an access node such as an eNB or gNB and the terminal device in a terrestrial network. Thus, maintaining high power performance with existing terminal devices, such as mobile phones, without increasing demand for power consumption in the terminal device is desirable, but may be challenging in some scenarios.

When utilizing a transparent architecture in an NTN, resources for the feeder link may be limited. Further, it may be expensive to increase the resources such that multi-beam configurations for a single geographic cell would be enabled in terms of having the resources required. For example, some areas may require support for more terminal devices than other areas, some areas may require higher data rates than other areas, and some areas may require more robust connection than other areas and so on. A simple way to achieve a low-cost solution is to have a single antenna, in an NTN platform, per one geographical cell. Yet, it would be desirable to also enable adaptation for different application needs.

If link budget is to be improved, transmission and/or reception may be performed via multiple satellites and then MIMO or multi-antenna diversity processing may be performed as well. It is to be noted that according to 3GPP standards for example, MIMO and multi-antenna diversity processing may require contributing antennas to be time synchronized for all terminal devices. To achieve the time synchronization, real-time timing advance (TA) for each terminal device may be utilized. Yet, in an NTN, a signal transmitted by a terminal device may arrive at different NTN platforms at different times causing a timing difference that may be greater than 2 symbols. Such timing difference may be outside of a range supported by the 3GPP standard. Thus, it may be that TA measurement may be used for timing synchronization only for such terminal devices that are served by the same NTN platform.

If a first NTN platform is located on a satellite, which may be called as a first satellite, signals transmitted by terminal devices that are served by the first NTN platform may be synchronized in terms of timing by utilizing 3GPP defined timing advance (TA) measurement and compensation. Yet, in case the terminal devices are also served by a second NTN platform located on a second satellite, the timing arrival of the signals transmitted by the terminal devices via the second NTN platform may not be synchronized with the signals transmitted via the first NTN. To achieve multi-antenna processing, there is to be timing synchronization for the signals transmitted by the terminal devices that are served by the first NTN platform and by the second NTN platform. Such timing synchronization may be achieved for example by having a delay buffer for the signals transmitted via the first NTN platform. The delay buffer may be dedicated to one terminal device and thus there may be a delay buffer per each terminal device per a serving NTN platform. Such a delay buffer allows a received signal to be timing adjusted for synchronization. Additionally, there may be a second timing advance, which is not used by a scheduler comprised in the on-ground access node but may be used locally for timing offset measurement and adjustment per a terminal device per a listening NTN platform. The second timing advance may thus be utilized for timing synchronization.

Figure 2:
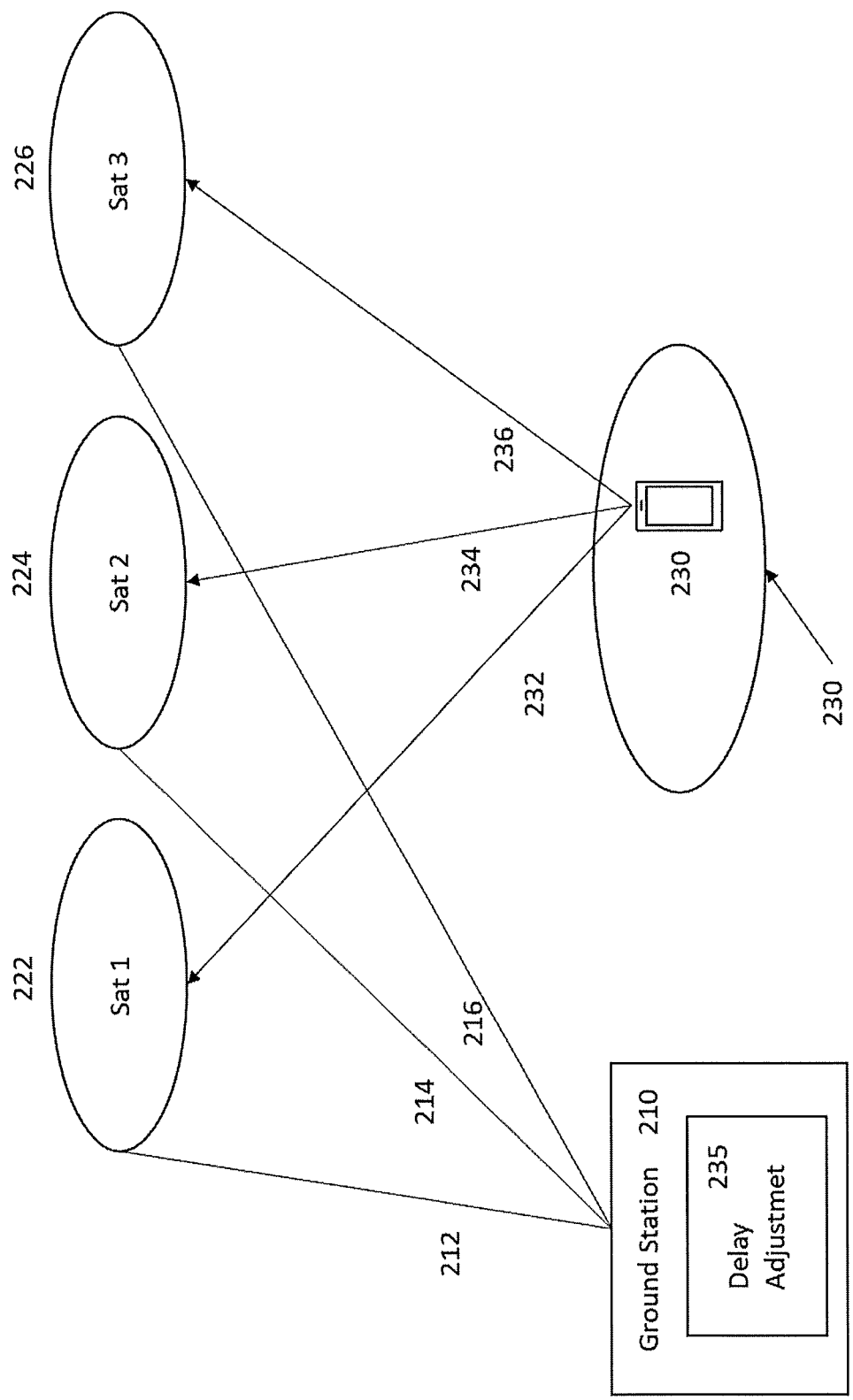
FIG. 2, FIG. 3 and FIG. 4 illustrate exemplary embodiments of a non-terrestrial network.

FIG. 2 illustrates an exemplary embodiment of an NTN. In this exemplary embodiment, there is an access node, comprised in an on-ground station 210, that may be understood as an on-ground access node. The access node comprises, or is connected to, a delay adjustment unit 235, which may be understood as a logical unit, for a terminal device 230 served by the NTN. It may be that the delay adjustment unit, that is caused to perform delay adjustment for the terminal device 230, is dedicated for the terminal device 230 and may therefore be understood to be per the terminal device 230. In this exemplary embodiment, there are multiple NTN payload, the first NTN payload 222, the second NTN payload 224 and the third NTN payload 226 and in this exemplary embodiment, the NTN payloads 222, 224 and 226 are comprised on their respective NTN platforms. An NTN platform may be understood to be any suitable flying non-terrestrial vehicle, such as LEO/MEO/GEO satellite or any suitable unmanned aerial vehicle, while the NTN payload may be understood to comprise communication equipment, such as antenna as well as other hardware and software for analogue and digital signal processing, on board of the NTN platform. The NTN payloads 222, 224 and 226 are visible from the same geographic cell 230 and the NTN payloads 222, 224 and 226 may be understood, in this exemplary embodiment, as space objects that receive RF signals, from different space angles, on a feeder link on a different frequency and convert the received RF signals to service link frequencies. In this exemplary embodiment, the access node 210 connects to the first NTN payload 222 with a feeder link 212, to the second NTN payload 224 with a feeder link 214, and to the third NTN payload 226 with a feeder link 216. The terminal device 230 transmits a signal 232 to the first NTN payload 222, a signal 234 to the second NTN payload 224 and a signal 234 to the third NTN payload 226. In this exemplary embodiment each NTN platform comprise a single antenna. Yet, this exemplary embodiment provides a good use case for a MIMO enhancement feature.

Figure 3:
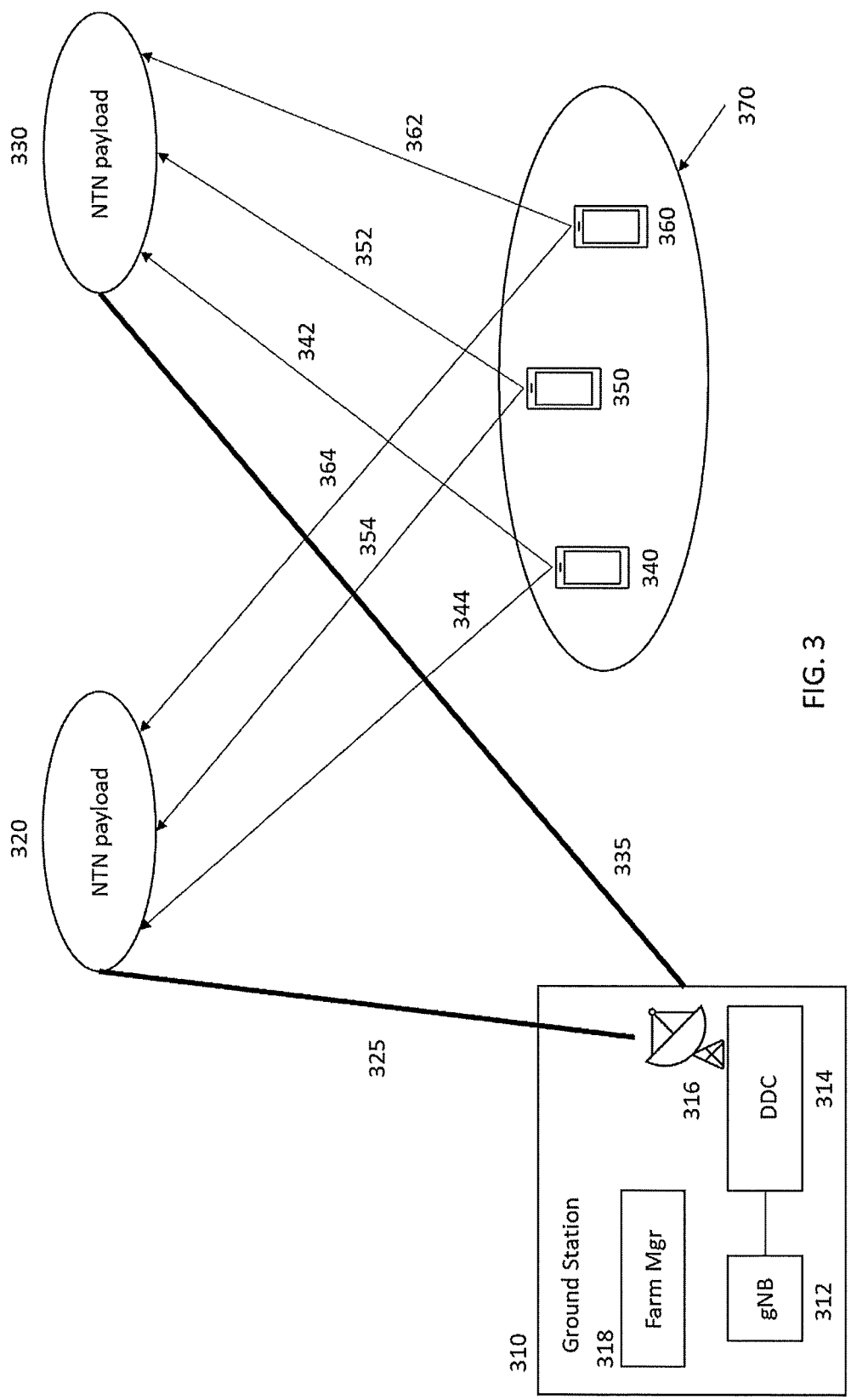

FIG. 3 illustrates another exemplary embodiment of an NTN. In this exemplary embodiment there are three terminal devices 340, 350 and 360 in a cell 370. The terminal devices 340, 350 and 360 in this exemplary embodiment transmit signals such that a transmitted signal is received by multiple NTN platforms, in this exemplary embodiment, by the first NTN payload 320 located on a first NTN platform and by the second NTN payload 330 located on a second NTN platform. Thus, the first NTN payload 320 receives the signal 344 transmitted by the terminal device 340 and the second NTN payload 330 receives the signal 342 transmitted by the terminal device 340. The first NTN payload 320 receives the signal 354 transmitted by the terminal device 350 and the second NTN payload 330 receives signal 352 transmitted by the terminal device 350. The first NTN payload 320 receives the signal 364 transmitted by the terminal device 360 and the second NTN payload 330 receives the signal transmitted by the terminal device 360. The signals received are subjected to timing offsets that are dependent on the respective distance between the transmitting terminal device and the receiving NTN payload.

The NTN in this exemplary embodiment also comprises a ground station 310 that comprises an access node 312, which is a gNB in this exemplary embodiment, and which is connected to a delay and doppler compensation (DDC) unit 314, which may be understood as a logical unit, and to a gateway 316. The ground station also comprises a farm manager 318. Using the DDC unit 314 and the gateway 316, the access node 312 is connected to the first NTN payload 320 via a feeder link 325 and to the second NTN payload 330 via a feeder link 335. Thus, in this exemplary embodiment, the terminal devices 340, 350 and 360 transmit uplink signals 342, 344, 352, 354, 362 and 364 that are received by the first NTN payload 320 and by the second NTN platform 330. Yet, signals transmitted by one terminal device are received at different angles by the two different NTN payloads, which then forward the received signals to the access node 312 using the feeder links 325 and 335. As such, when the access node 312 receives the signals, it performs a timing synchronization between signals received from the first NTN payload 320 and signals received from the second NTN payload 330 for signals transmitted by each of the terminal devices 340, 350 and 360. Therefore, to be able to utilize UL MIMO over multiple NTN payloads, timing synchronization of the signals transmitted by the terminal devices the access node via the NTN payloads, is required.

In this exemplary embodiment, the first NTN payload 320 configures the terminal devices 340, 350 and 360 in a physical resource block (PRB) block1, respectively. The transmission timing for the terminal devices 340, 350 and 360 is configured to be aligned to the first NTN payload 320.

The transmission timing may be configured to be aligned for example through Sat1_TA_ueN. The second NTN platform 330 however is in a different location than the first NTN payload 320 and the terminal devices 340, 350 and 360 have different distances to the second NTN platform 330 than to the first NTN payload 320. Thus, as the same signals, that are transmitted to the first NTN payload 320, are also transmitted to the second NTN payload 330, the signals received at the second NTN payload 330 are not timing synchronized. As such, when there are multiple NTN payloads, a terminal device can be configured only on one NTN payload, which may be referred to as a primary NTN payload, where TA of the terminal device is a variance of the distance of the terminal device to the primary NTN payload. The other NTN payloads may be understood as listening NTN payloads for which the TA measured by the access node for a terminal device is not applicable to the listening satellites. As a result, the listening satellites receive signals from the terminal devices that are not synchronized in timing.

Figure 4:
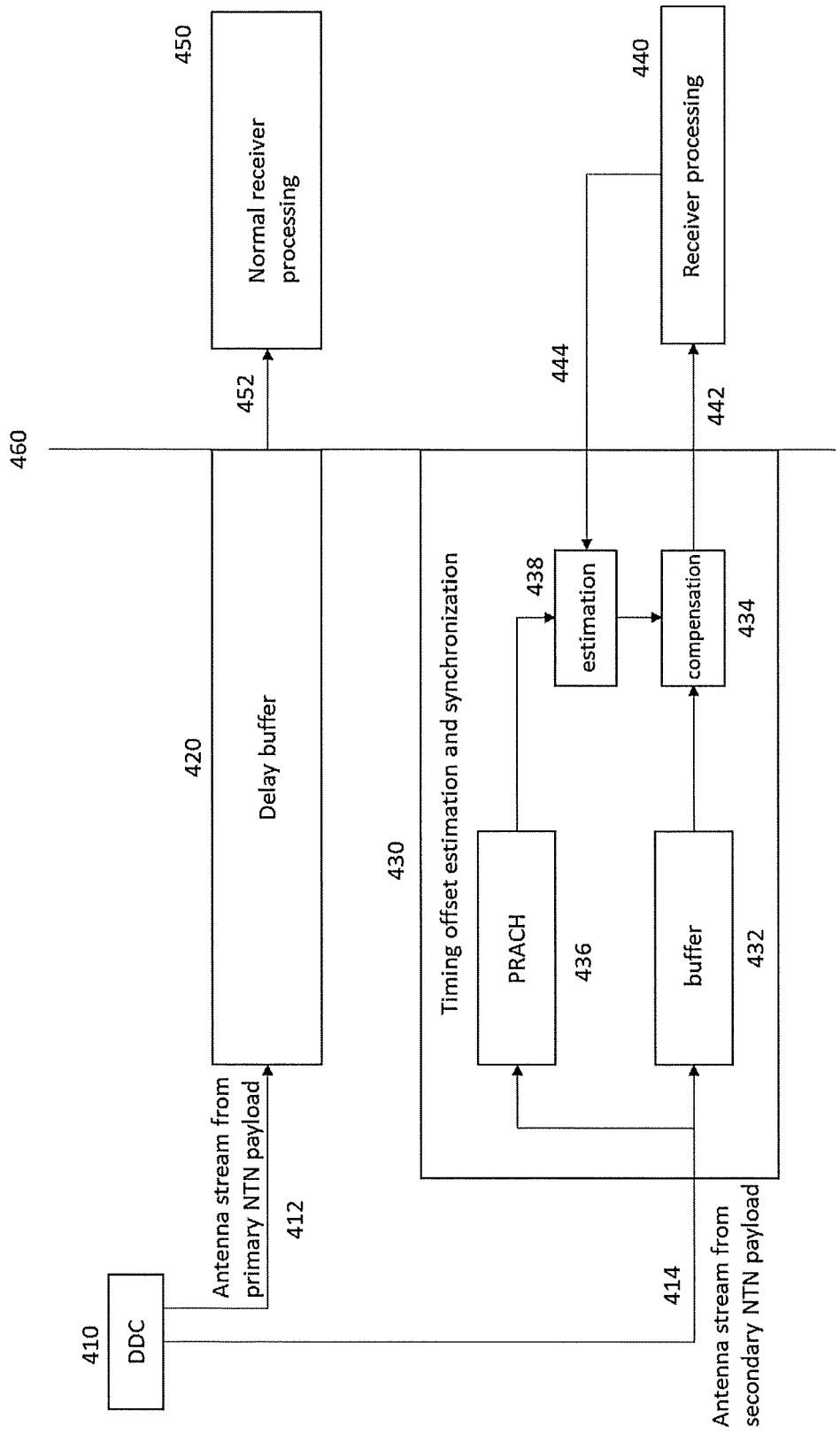

FIG. 4 illustrates a further exemplary embodiment of an NTN. In this exemplary embodiment an access node receives antenna streams from a primary NTN payload and from one or more listening NTN payloads. The antenna streams comprise the signals received from one or more terminal devices by the primary NTN payload and by the listening NTN payloads and are then forwarded to the access node as an antenna stream using a feeder link. As the antenna streams comprise signals that are not synchronized in timing, the access node may estimate a cross-NTN platform timing offset for a terminal device and then compensate for the timing offset. Thus, the timing of the signals transmitted by the terminal device may be re-synchronized at an L1 receiver front-end at the access node.

In this exemplary embodiment, the access node, which in this exemplary embodiment is a gNB, configures PRB and TA of the terminal devices, from which signals are received via multiple NTN payloads. As the access node configured the PRB and TA, those match the timing of the primary NTN payload. Thus, one or more listening NTN payloads listen to signals of the terminal devices that are configured by the primary NTN payload. The antenna streams form the primary NTN payload and from the listening NTN payload are received by the access node via a DDC unit 410. After this, the antenna stream 412 from the primary NTN payload may be received such that regular receiver processing is applied since the TA per terminal device ensures that all the timings of the terminal devices at the receiver are synchronized. Yet, before that, the antenna stream 412 may be directed to a delay buffer 420 such that it may be synchronized with the antenna stream 414 that is an antenna stream received from a listening NTN payload. After the delay, the delayed antenna stream 452 received from the primary NTN payload is directed to the receiver unit 450, which is a logical receiving unit and performs normal receiver processing for the antenna stream 452.

As the access node receives the antenna stream 414 from a listening NTN payload, it may add a processing unit 430, which may be called as timing offset estimation and compensation. The unit 430 may be understood as a logical unit. In the unit 430 there is a buffer 432 for the listening NTN payload. In case there are multiple listening NTN payloads, there may be plurality of buffers such that there is a buffer for each listening NTN platforms. The buffer 432 stores the antenna stream 414 for adjusting timing offset for the terminal device and the related PRBs. If there are signal received from a plurality of terminal devices, the timing offset may be performed for each terminal device and their related PRBs.

The unit 430 also comprises physical random access channel (PRACH) processing 436. The PRACH processing 436 processes the signals transmitted by the terminal device and received from listening NTN payloads and produces as an output a coarse TA measurement for the terminal device that may be used by the unit 430. As coarse TA measurement may be a measurement that has accuracy less than a predetermined threshold accuracy. Thus, the coarse TA measurement may not be sent to L2 for scheduling purpose not to the terminal device for adjusting transmit timing for primary NTN payload. Instead, the TA of the terminal device for L2 scheduling and synchronization of the terminal device uses the TA measurement from the antenna stream received from the primary NTN payload. The listening NTN payload then passively listens to the signal originally designed for the primary NTN payload.

The coarse TA measurement may then be used as an input by timing offset estimation unit 438, which may be understood as a logical unit. The timing offset estimation unit 438 may receive as another input a TA measurement 444 that is received from a layer 1, (L1) receiver. The TA measurement 444 is more precise than the coarse TA measurement. The combination of TA measurement 444 and the coarse TA measurement may then be used to determine an offset compensation. In other words, the timing offset estimation unit 438 determines and offset estimation based on the coarse TA and the TA measurement 444, and the offset estimation may be used to compensating the timing offset.

The unit 430 also comprises a timing offset compensation unit 434 which may be understood as a logical unit, and which compensates the timing offset for the terminal device. The signal received from the terminal device via the listening NTN payload is received from the buffer 432 for the timing offset compensation. In case signals are received from multiple terminal devices, the offset compensation may be done for each terminal device. The timing offset compensation unit 434 receives a timing offset estimation from the timing offset estimation unit 438 and thus the offset compensation is performed based on the estimated timing compensation. The offset compensation may be performed PRB by PRB. The timing offset compensation enables terminal device to be aligned in timing such that MIMO receiver processing may be performed. For example, if there are multiple terminal devices, the terminal devices are aligned in timing, in other words, there is timing synchronization, and MIMO receiver processing may be performed by the unit 440, which takes the timing offset compensated signal or signals as an input and also provides the TA 444 to the timing offset estimation unit 438. In case there are multiple terminal devices, the TA 444 may be performed for each terminal device. As is indicated by the line 460, timing alignment to all NTN platforms may be achieved and as such, MIMO processing may be enabled.

In some exemplary embodiments, timing synchronization over multiple NTN payloads may also be performed for DL MIMO. For example, an access node, such as a gNB, that is an on-ground access node, may transmit a DL signal to a terminal device via first NTN payload that is a primary NTN payload. The access node may transmit the signal to DDC for adjusting transmit timing delay based on a TA measurement using a path associated with the first NTN payload. After this, the signal is transmitted to the first NTN payload using its associated primary feeder link. Then, the primary NTN payload may further re-transmit the signal to a terminal device.

Additionally, the access node may transmit the same DL signal to the terminal device using a second NTN payload that is a listening NTN payload. The access node may transmit the DL signal to the DDC for adjusting transmit timing delay based on the TA measurement using a path associated with the second NTN payload. Further, after the timing delay has been adjusted, the second NTN payload re-transmits the signal to the terminal device. In this way, the signal received by the terminal from the first NTN payload and the signal received by the terminal device from the second NTN payload will be timing synchronized since the transmit timing delay is incorporated to the different distances using the corresponding TAs of the NTN payloads.

In some exemplary embodiment, an NTN payload, which is compatible with the exemplary embodiments above, may comprise a plurality of antennas, in other words, at least two antennas. The antennas may have polarization angles that are orthogonal to each other for a geographical cell such as the geographical cells 230 and 370. Having the antennas with orthogonal polarization angles may enable compensating for polarization loss and for performing multi-antenna diversity DL MIMO over the NTN payload. Thus, the resources of the NTN payload may be optimized. It is to be noted that different geographic cells could have different configurations to optimize resources and performance of an NTN payload.

In an exemplary embodiment there may be multi-antenna performance enabled by one NTN payload for a geographical cell. The multi-antenna per one geographic cell solution allows introducing the polarization compensation, multi-antenna transmit diversity, and MIMO on the single NTN platform features to enhance the performance. Yet, this solution may also require increasing of feeder link bandwidth. Therefore, it may be that two antennas offer a solution that is reasonable in terms on increased consumption of the feeder link budget. Also, in some exemplary embodiments, there may be, in an NTN, a geographical cell that is served by an NTN payload with one antenna and another geographical cell that is served by another NTN payload that comprises two antennas with orthogonal polarization angles.

Figure 5:
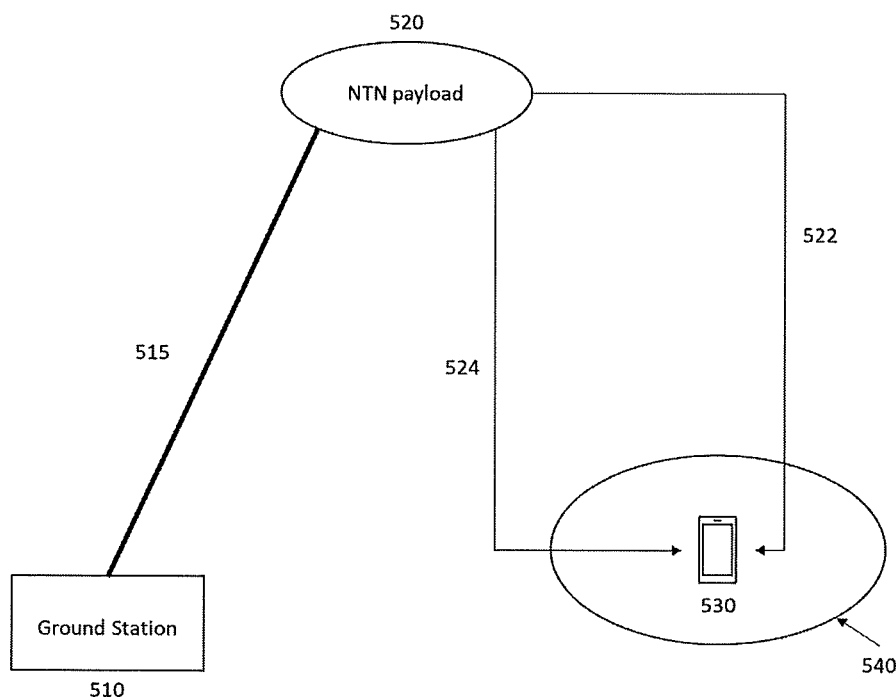
FIG. 5 illustrates an exemplary embodiment with a non-terrestrial payload located on a non-terrestrial platform.

FIG. 5 illustrates an exemplary embodiment with an NTN payload 520 located on a NTN platform and comprising two antennas for downlink transmissions 522 and 524. The exemplary embodiment described in FIG. 5 is compatible with the previous exemplary embodiments. There is also an on-ground station 510 that comprises an access node that is connected to the NTN payload 520 via the feeder link 515. The NTN payload 520 serves the geographical cell 540. The two antennas have orthogonal polarization angles with respect to each other. The antennas may be configured in various manners.

In one option, the two antennas may be configured such that one of the antennas is allocated to the geographical cell 540. The other antenna may be allocated to another geographical cell which however may not be used. If the other geographical cell is not being used, the other antenna may be re-allocated such that it is also allocated to the geographical cell 540. It is to be noted that the diameter of the geographical cell is not increased. However, the total service area that the NTN payload serves, is reduced by V in a diameter if the total service area is considered to be a circle. Thus, if the total served area is not to be reduced, more NTN platforms are required to cover the same area, which may be considered as the cost of having the benefits of two antennas per cell for all cells served by the NTN payload. The benefits may comprise for example obtaining a 3 dB additional antenna gain, compensating polarization impairment as the two antennas have orthogonal polarization angles with respect to each other, having 2×2 MIMO between one NTN payload and one terminal device and having a hybrid MIMO between multiple NTNs and one terminal device.

In another option for configuration, the NTN payload may comprise two antennas for serving each geographical cell that is served by the NTN payload such that a diameter of the cells is increased by $\sqrt{2}$. This configuration allows the number of platforms, and the total service area to remains the same. In this configuration, the total number of cells served by the NTN payload however is reduced by 2. As a result, a total number of antennas comprised in the NTN payload is not change, but the total number of geographic cells is reduced by 2. As the diameter of a geographical cell, such as the cell 540 is increase by $\sqrt{2}$, the antenna beamwidth is also to be increased by $\sqrt{2}$. Therefore, each antenna transmit power will be reduced by 3 dB, but the total gain of the 2 antennas is the same compared to a single antenna. In this option, there is no additional transmit gain of the 2 antennas per one geographical cell. This configuration may have benefits such as having the compensation for the polarization impairment as with the previous option, having a 2×2 MIMO between single NTN payloads and a terminal device, having a hybrid MIMO between multi-NTN payloads and a terminal device and/or having, on average, doubled cell bandwidth on the feeder link, which allows increasing bandwidth per one geographical cell.

As mentioned above, the NTN payload 520 may have two antennas for the geographical cell 540. If the NTN payload had just one antenna for the geographical cell 540, the one antenna having linear polarization, the polarization attenuation loss could be between [0.0, 1.0], which may be considered as a uniform distribution. With the two antennas with orthogonal polarization angles with respective to each other, the polarization attenuation loss may be between [0.707, 1.0] by a uniform distribution. Table 1 below illustrates examples of polarization losses at different situations:

TABLE 1

|  | 1 ant per satellite | 2 ant per satellite |
|---|---|---|
| Assumptions | Single antenna polarization: Polarization loss = (0.0, 1.0) for channel estimation. Polarization loss = (0.707, 1.0) for data symbols Polarization distribution: uniform | 2 orthogonal polarization angles: Polarization loss = (1.0, 1.0) for channel estimation. Polarization loss = (0.707, 1.0) for data symbols Polarization distribution: uniform |
| coverage lever = 50% | Polarization loss = (0.5, 1.0) => (−6 dB, 0 dB) | Polarization loss = (0.85, 0) => (−1.4 dB, 0 dB) |
| Coverage lever = 90% | Polarization loss = (0.1, 1.0) => (−20 dB, 0 dB) | Polarization loss = (0.74, 0) => (−2.6 dB, 0 dB) |

TABLE 1-continued

| | 1 ant per satellite | 2 ant per satellite |
|---|---|---|
| Coverage lever = 95% | Polarization loss = (0.05, 1.0) => (−26 dB, 0 dB) | Polarization loss = (0.72, 0) => (−2.9 dB, 0 dB) |

For controlling the polarization angle between an antenna comprised in the NTN payload 520 and an antenna comprised in the terminal device 530, various methods may be utilized. For example, the two antennas comprised in the NTN payload 520 have orthogonal polarization angles with respect to each other. This approach may be applicable to any terminal device.

In another example the NTN payload may have one antenna only for a geographical cell, but the terminal device may have multiple antennas with different polarization angles that may also be orthogonal polarization angels. In this example, the access node may transmit a command to the terminal device to select a target antenna, which is one of the antennas comprised in the terminal device. The access node may then measure the link performance and if the link performance is below a threshold, the access node may instruct the terminal device to switch the antenna to minimize polarization loss. It is to be noted that in case there are multiple NTN payload serving the geographical cell in which the terminal device is located in, the switch of target antenna of the terminal device may be controlled by one NTN payload only.

In a further option, there may be for DL the two antennas comprised in the NTN payload 520 transmitting signals 522 and 524 to the terminal device 530, and the signals are reflected from an obstacle such as a building on the ground, thereby arriving at the terminal device 530 from different directions as illustrated in FIG. 5. In this option, there is a DL 2×2 MIMO. The 2×2 MIMO may in one option have 1-layer2, such as LTE transmission mode (TM)2 transmit delivery, to increase signal to noise ratio (SNR) and so increase modulation coding scheme (MCS) table data rate. Alternatively, the 2×2 MIMO may have 2-layer, such as LTE TM4 closed loop spatial multiplex, to increase data rate.

Figure 6:
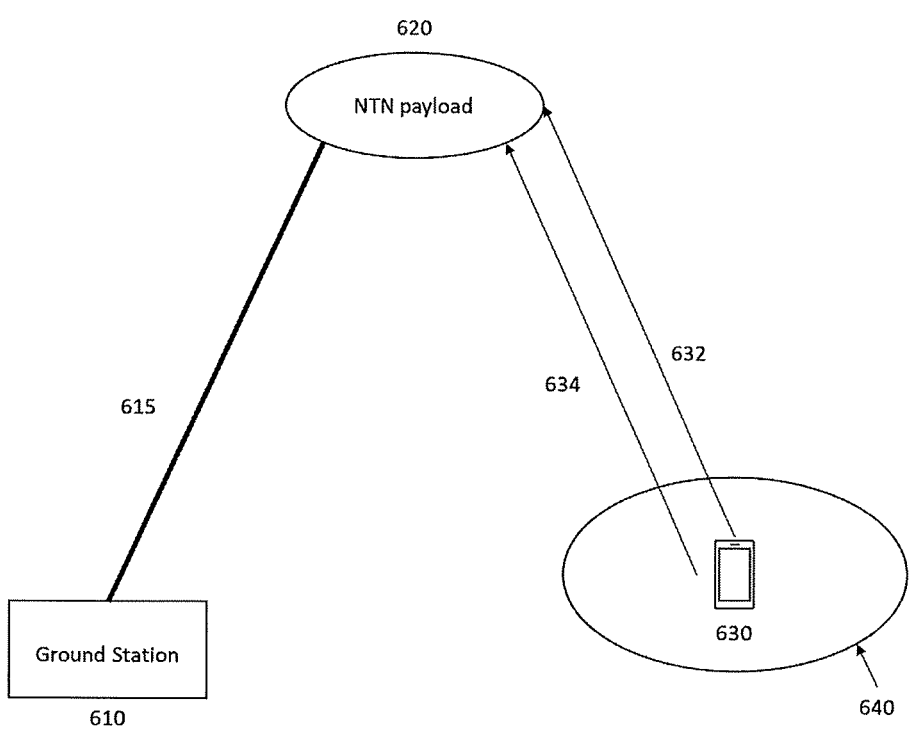
FIG. 6 illustrates an exemplary embodiment with multi-antenna uplink transmission.

FIG. 6 illustrates an exemplary embodiment in which a terminal device 630 comprises a plurality of antennas for transmission, in other words, multi-antenna uplink. The NTN payload 620 is located on a satellite and it serves a geographical cell 640 in which the terminal device 630 is located in. The on-ground station 610 comprises an access node such as a gNB that is connected to the NTN payload 620 via a feeder link 615. The terminal device 630 may thus transmit signals 632 and 634 using two antennas, one for each signal, to the NTN payload 620. The signals 632 and 634 may however be reflected from obstacles, such as a building, on the ground and then go to the NTN payload 620. Due to the long distance from the ground to the NTN payload 620, the angle of arrivals of the signal 632 and 634 in satellite may still be almost the same. In such a case, if the NTN payload 620 comprises 2 antennas for receiving may be useful in terms of diversity.

It is to be noted that in some exemplary embodiment an NTN payload serving a geographical cell may further comprise two antennas for feeder link usage as well. In such an exemplary embodiment, the feeder link bandwidth is shared by half of the number of all geographical cells served by the NTN payload. Therefore, each geographical cell has a doubled bandwidth in feeder link. Table 2 below illustrates examples of feeder link usage for multi-antennas per one geographical cell.

TABLE 2

| Feeder link parameters | Single antenna per cell for all cells | 2 antenna per cell for all cells |
|---|---|---|
| Total bandwidth | FEEDER_LINK_BANDWIDTH_MHz | FEEDER_LINK_BANDWIDTH_MHz |
| Total supported cells | MAX_NUMBER_CELL | MAX_NUMBER_CELL/2 |
| Average bandwidth per cell | FEEDER_LINK_BANDWIDTH_MHz/ MAX_NUMBER_CELL | 2 * FEEDER_LINK_BANDWIDTH_MHz/ MAX_NUMBER_CELL |
| Supported UE Freq band | Support more 5 MHz and 10 MHz UEs | Support more 10 MHz, 15 MHz UEs |

It is to be noted that for the exemplary embodiments described above various optimization in terms of resource and performance of an NTN payload may be used. The optimization may be chosen based on for example application needs in a certain region, and for a geographical cell various options may be used alone or in a combination with some of the other options may be used to optimize the resource and performance of the NTN payload. The options may comprise for example having a single antenna, a standard cell diameter, and standard antenna beamwidth. Additionally, or alternatively, two antennas, a standard diameter of a geographical cell and a standard beamwidth could be used. Additionally, or alternatively, two antennas, increasing diameter of a geographical cell by $\sqrt{2}$, and increasing beamwidth by $\sqrt{2}$ may also be selected. This option may reduce the total number of geographical cells, but the diameter of each graphical cell is increased. Alternatively, or additionally, the access node may adapt actual transmission within constraints of antenna configuration. Additionally, or alternatively, the NTN payload may be made aware of transmission mode changes, by for example via common public radio interface (CPRI) control link, and the NTN payload may then optimize feeder link and/or beams accordingly by for example dropping unused beams.

Figure 7:
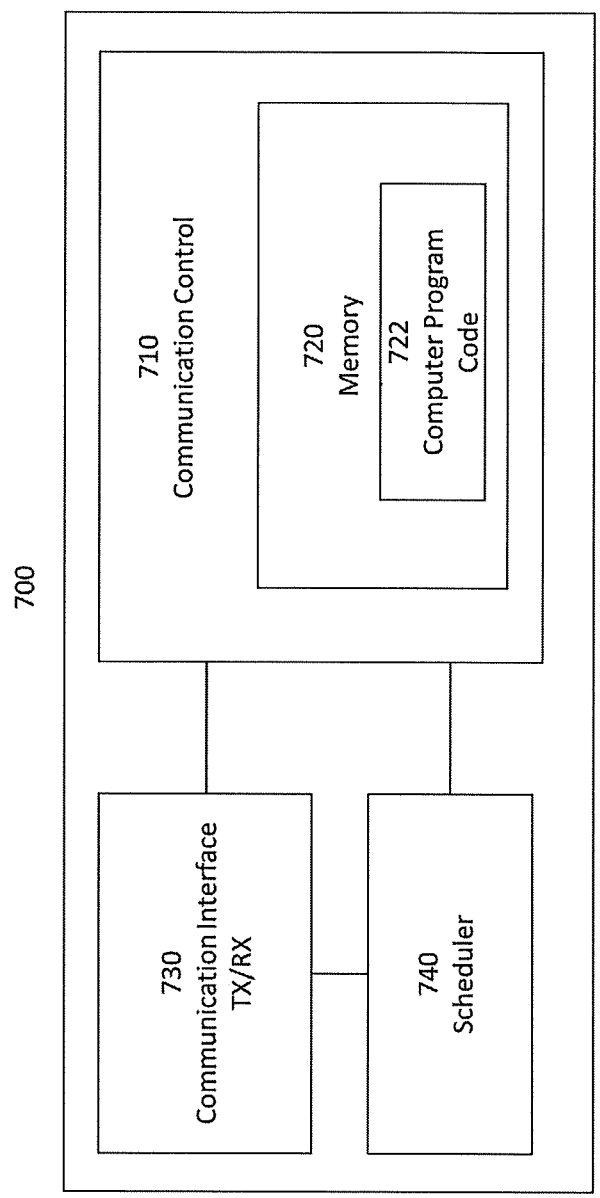
FIG. 7 illustrates an exemplary embodiment of an apparatus.

The apparatus 700 of FIG. 7 illustrates an example embodiment of an apparatus that may be an access node or be comprised in an access node. The apparatus may be, for example, a circuitry or a chipset applicable to an access node to realize the described embodiments. The apparatus 700 may be an electronic device comprising one or more electronic circuitries. The apparatus 700 may comprise a communication control circuitry 710 such as at least one processor, and at least one memory 720 including a computer program code (software) 722 wherein the at least one memory and the computer program code (software) 722 are configured, with the at least one processor, to cause the apparatus 700 to carry out any one of the example embodiments of the access node described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 700 may further comprise a communication interface 730 comprising hardware and/or software for realizing communication connectivity according to one or more communication protocols. The communication interface 730 may provide the apparatus with radio communication capabilities to communicate in the cellular communication system. The communication interface may, for example, provide a radio interface to terminal devices. The apparatus 1700 may further comprise another interface towards a core network such as the network coordinator apparatus and/or to the access nodes of the cellular communication system. The apparatus 700 may further comprise a scheduler 1740 that is configured to allocate resources.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
 at least one processor; and
 at least one memory storing instructions that, when executed with the at least one processor, cause the apparatus to:
  receive a first antenna stream from a first feeder link to a first non-terrestrial network payload, wherein the first antenna stream comprises signals, the signals being transmitted with a plurality of terminal devices, that are synchronized in time;
  receive a second antenna stream from a second feeder link to a second non-terrestrial network payload, wherein the second antenna stream comprises signals, the signals being transmitted with the plurality of terminal devices, that are not synchronized in time;
  store the first antenna stream in a first buffer and the second antenna stream in a second buffer;
  obtain a first timing advance based on physical random access channel processing performed to the second antenna stream;
  obtain a second timing advance from a receiver;
  obtain an estimation of timing offset based on the first timing advance and the second timing advance;
  retrieve the second antenna stream from the second buffer and perform timing offset compensation to the second antenna stream based on the estimation of the timing offset; and
  retrieve the first antenna stream from the first buffer such that it is synchronized with the second antenna stream.

2. An apparatus according claim 1, wherein the instructions, when executed with the at least one processor, cause the apparatus to perform the timing offset compensation with physical resource block.

3. An apparatus according to claim 1, wherein the second timing advance is more precise than the first timing advance.

4. An apparatus according to claim 1, wherein the first antenna stream and the second antenna stream comprise transmissions that are transmitted with one or more terminal devices using multi-antenna transmission.

5. A system, comprising:
 an access node located on the ground, a first non-terrestrial network platform and a second non-terrestrial network platform, wherein the system further comprising:
 at least one processor; and
 at least one memory storing instructions that, when executed with the at least one processor, cause the system to:
  receive, with the first non-terrestrial network payload, a first antenna stream comprising signals that are synchronized in time, and transmit the first antenna stream to the access node;
  receive, with the second non-terrestrial network payload, a second antenna stream comprising signals that are not synchronized in time, and transmit the second antenna stream to the access node;
  store, with the access node, the first antenna stream to a first buffer and the second antenna stream to a second buffer;
  obtain, with the access node, a first timing advance based on physical random access channel processing performed to the second antenna stream;
  obtain, with the access node, a second timing advance from a receiver;
  obtain, with the access node, an estimation of timing offset based on the first timing advance and the second timing advance;
  retrieve, with the access node, the second antenna stream from the second buffer and perform timing offset compensation to the second antenna stream based on the estimation of the timing offset; and
  retrieve, with the access node, the first antenna stream from the first buffer such that it is synchronized with the second antenna stream.

6. A system according to claim 5, wherein the access node, the first non-terrestrial network payload and the second non-terrestrial platform are configured to use a transparent payload architecture.

7. A system according to claim 5, wherein the first non-terrestrial payload is located on a first non-terrestrial platform and the second non-terrestrial payload is located on a second non-terrestrial platform.

8. A system according to claim 5, wherein the first non-terrestrial payload and the second non-terrestrial payload are visible from a geographical cell from which the first and the second antenna stream are received.

9. A method, comprising:
 receiving a first antenna stream from a first feeder link to a first non-terrestrial network payload, wherein the first antenna stream comprises signals, the signals being transmitted with a plurality of terminal devices, that are synchronized in time;

receiving a second antenna stream from a second feeder link to a second non-terrestrial network payload, wherein the second antenna stream comprises signals, the signals being transmitted with the plurality of terminal devices, that are not synchronized in time;

storing the first antenna stream in a first buffer and the second antenna stream in a second buffer;

obtaining a first timing advance based on physical random access channel processing performed to the second antenna stream;

obtaining a second timing advance from a receiver;

obtaining an estimation of timing offset based on the first timing advance and the second timing advance;

obtaining retrieving the second antenna stream from the second buffer and perform timing offset compensation to the second antenna stream based on the estimation of the timing offset; and retrieving the first antenna stream from the first buffer such that it is synchronized with the second antenna stream.

10. A computer program tangibly embodied on a non-transitory program storage device, comprising instructions for causing an apparatus to perform at least the following:

receive a first antenna stream from a first feeder link to a first non-terrestrial network payload, wherein the first antenna stream comprises signals, the signals being transmitted with a plurality of terminal devices, that are synchronized in time;

receive a second antenna stream from a second feeder link to a second non-terrestrial network payload, wherein the second antenna stream comprises signals, the signals being transmitted with the plurality of terminal devices, that are not synchronized in time;

store the first antenna stream in a first buffer and the second antenna stream in a second buffer;

obtain a first timing advance based on physical random access channel processing performed to the second antenna stream;

obtain a second timing advance from a receiver;

obtain an estimation of timing offset based on the first timing advance and the second timing advance;

retrieve the second antenna stream from the second buffer and perform timing offset compensation to the second antenna stream based on the estimation of the timing offset; and retrieve the first antenna stream from the first buffer such that it is synchronized with the second antenna stream.

* * * * *